Nov. 25, 1958        F. KUHRT        2,862,189

HALL VOLTAGE DEVICE FOR TRANSLATING ELECTRIC MAGNITUDES

Filed March 26, 1958        2 Sheets-Sheet 1

2,862,189

HALL VOLTAGE DEVICE FOR TRANSLATING ELECTRIC MAGNITUDES

Friedrich Kuhrt, Nurnberg, Germany, assignor to Siemens-Schuckertwerke Aktiengesellschaft, Berlin-Siemensstadt, Germany, a German corporation Application March 26, 1958, Serial No. 724,021

Claims priority, application Germany April 10, 1957

12 Claims. (Cl. 332—51)

My invention relates to electric translating devices comprising a Hall voltage generator for modulating a direct-current or low-frequency-current magnitude, converting direct current into alternating current, or similar translating purposes.

It is known to use the Hall effect for converting a direct-current magnitude into an alternating-current magnitude by passing the direct current through a semiconducting Hall plate and subjecting the Hall plate to a magnetic field excited by means of an alternating current of constant frequency and constant intensity. An alternating current of the same frequency can then be taken from the Hall electrodes of the semiconductor plate, and this alternating voltage varies its amplitude in strict dependence upon the variation of the direct current. For avoiding disturbing inductive voltages in the output circuit of the Hall electrodes, it has further been proposed to pass an alternating current of constant frequency and constant intensity through the semi-conducting Hall plate and to excite the magnetic field by the direct current to be converted. In the latter type device the variable control current that produces the magnetic field may also consist of a periodically variable direct current or alternating current, it being only essential that the current passed through the semiconducting Hall plate have a higher frequency of variation than the excitation current of the magnetic field. Both currents, namely the one passing through the semiconductor plate and the current for exciting the magnetic field, may vary in accordance with any desired regular or irregular functions, for example, they may vary periodically or may have an aperiodic characteristic. The wave shape of the variation, too, is of minor significance so that impulses or incrementally varying currents may be used which, if desired, may also change their polarity.

The Hall plate in such devices has been made of semiconducting material of high carrier mobility. Because of the saturation limit of the magnetic core materials, the carrier mobility should be higher than 6000 cm.$^2$/volt second. Such semiconducting materials are known, for instance, in the form of $A_{III}B_V$ compounds, namely compounds of respective elements from the third and fifth groups of the periodic system. Preferred as such semiconducting compounds of high carrier mobility are indium antimonide and indium arsenide.

In Hall-voltage generating devices of the above-mentioned type, the remanence of the magnetic core material may have a disturbing influence upon the desired performance. Due to such remanence, such a modulating or translating device exhibits a memory effect so that, once the device has been used, it will generate a residual alternating voltage of greater or lesser magnitude even when the controlling input current has declined exactly to zero. One may contemplate reducing the detrimental effect of remanence to a permissible degree by using special materials for the magnetic field core. Core materials proposed for such purposes have become known under the name "Perminvar-Ferrite." This material, however, has a very low initial permeability and hence greatly reduces the efficiency of the translating device.

It is an object of my invention to eliminate these disadvantages and to afford the use of high-quality magnetic materials of the usual kind without causing the above-described deficiencies.

To this end, and in accordance with my invention, I provide a Hall-voltage generating device generally of the above-described type with means for substantially nullifying the remanence of the magnetic field system. According to a more specific feature, such reduction or elimination of remanence is obtained by inductively subjecting the magnetic core system to an alternating current whose frequency is high compared with the highest signal or carrier frequencies required for the translating operation proper.

These and other objects, advantages and features of my invention will be more fully explained below with reference to the drawings, in which—

Figure 1:
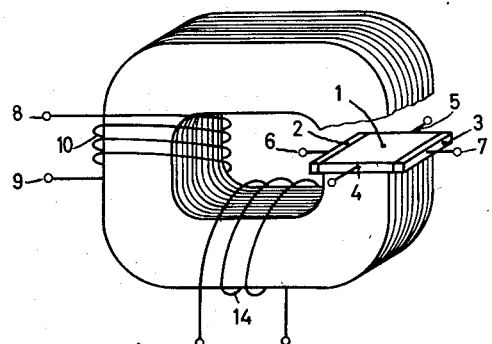
Fig. 1 shows schematically and in perspective a Hall-voltage generator applicable for the purposes of my invention.

In Fig. 1, the semiconducting body of the Hall plate, consisting for instance of indium antimonide or indium arsenide, is denoted by 1. The Hall plate is provided with two current supply electrodes 2, 3 and with two lateral electrode connections 4 and 5 for supplying the Hall voltage. The Hall plate 1 is located in a very narrow gap, about 20 microns wide, of a magnetic field structure. Impressed upon the terminals 6 and 7 of the current electrodes 2, 3 is an alternating voltage of substantially constant carrier frequency and constant amplitude so that the Hall plate, during operation, is traversed by carrier-frequency current. The control or signal voltage proper, which is to be converted into an alternating voltage, is impressed upon input terminals 8 and 9 and passes a current through the field excitation coil 10 of the magnetic system so that the magnetic field to which the Hall plate is exposed varies in accordance with the signal voltage. As mentioned, the output voltage is taken from the Hall-electrode connections 4 and 5. When using as semiconducting material a substance with a carrier mobility of 20,000 cm.$^2$/volt second, as is obtained with the above-mentioned InSb and InAs substances, a power amplification of approximately ten can be attained in this manner.

When mentioning in the foregoing, as well as hereinafter, that the field winding 10 is excited at terminals 8, 9 by a direct-current signal, it should be understood that the signal voltage may be any relatively slowly variable signal voltage which is to be modulated or otherwise translated into an output voltage of much higher frequency. Consequently, the excitation current magnitude applied to terminals 8, 9 may also consist of an alternating current of low frequency as compared with the carrier frequency of the current passing through the terminals electrodes 2, 3 of the Hall plate 1. The voltages impressed upon the terminals 6 and 7 either serve as carrier waves or for the formation of modulation products. In cases where the input signal is an alternating voltage, the alternating voltage impressed upon the terminals 6 and 7 must have a frequency of a higher decimal order of magnitude. While generally the carrier-frequency currents flowing through terminals 6, 7 are kept constant, it may be desirable for certain purposes to give these currents a variable amplitude or frequency, for instance when employing the device for computing purposes.

The power required in the input circuit 8—10—9 of the device is in the order of magnitude of microwatts, whereas an output power in the order of milliwatts may be taken from the Hall electrodes 4 and 5. Since the excitation circuit of the core system is excited by direct current or by an only slowly variable current, no appreciable inductive error voltages, as occurring in devices with a signal-energizing Hall-plate circuit and not fully suppressible in such devices even when twisting the conductors, will manifest themselves in the output circuit of the above-described device.

As mentioned, however, a device of the above-described type, disregarding for the present the additional demagnetizing coil 14 described below, shows undersirable memory effects due to the remanence of the core material, or loses much of its otherwise obtainable degree of efficiency if the core is made of ferrite material of slight initial permeability.

By virtue of the invention, however, such short-comings are avoided or very greatly minimized by making the iron core of the magnetic system of a laminated or comminuted ferromagnetic material of the usual high-quality type as heretofore employed in such devices, and providing the Hall-generating device with a high-frequency circuit which is inductively linked with the core for nullifying the remanence of the magnetic material.

According to a more specific feature of my invention, the remanence-nulling circuit comprises an additional winding on the magnet core of the magnetic system, namely the winding shown in Fig. 1 at 14 and also apparent from the respective circuit diagrams in Figs. 2 and 4 to 6 described further below. This additional coil is preferably connected in series or parallel relation to a capacitor to form together therewith a tank circuit whose natural frequency has the desired high value in comparison with the carrier frequency.

The frequency of the nulling currents used according to the invention is preferably at least one or two decimal orders of magnitude above the highest frequency to be utilized for the translating purposes proper. The nulling alternating currents of high frequency may be caused to continuously flow through the nulling circuit. They may also be superimposed upon the direct currents or slowly variable alternating currents which are supplied to the input circuit of the device. In most cases, however, it is preferable to provide for intermittent application of currents. For example, the nulling currents may be caused to act impulse-wise by triggering these impulses, each comprising a train of high-frequency oscillations, in the rhythm of the input signals. The triggering of the pulses may be effected each time shortly after termination of an input signal.

According to a further feature of my invention, the nullifying-alternating voltage is produced within the Hall-generating device itself so that it is not necessary to use extraneous current sources for this purpose. For controlling the above-mentioned intermittent operation of the remanence-nulling means, it is further readily possible to provide a feedback coupling between the nulling circuit and the carrier-frequency energizing circuit so that the feedback directly or indirectly controls the generation or issuance of intermittent high-frequency pulses. It is preferable in such cases to make at least the decay of the oscillations of the nullifying voltage, preferably also the commencement of the oscillations, dependent upon the voltage or current peaks of the carrier-frequency wave. If desired, the initiation or the termination of the high-frequency oscillations in the nulling circuit can be limited to only the positive or only the negative half waves of the carrier frequency. This can be effected, for example, by controlling the high-frequency oscillatory wave trains by means of a hunting feedback connection. However, it is also within the scope of the invention to control the intermittent operation of the nullifying alternating voltages independently of the carrier frequency by means of a fixed frequency supplied, for instance, from an additional source.

The above-mentioned features of my invention will be more fully described with reference to the circuit diagrams shown in Figs. 1 and 4 through 6, each of which includes a Hall-voltage generating device with an additional winding 14 as shown in Fig. 1 and explained above.

In all circuit diagrams, the same reference numerals are used as in Fig. 1 for corresponding components respectively.

Figure 2:
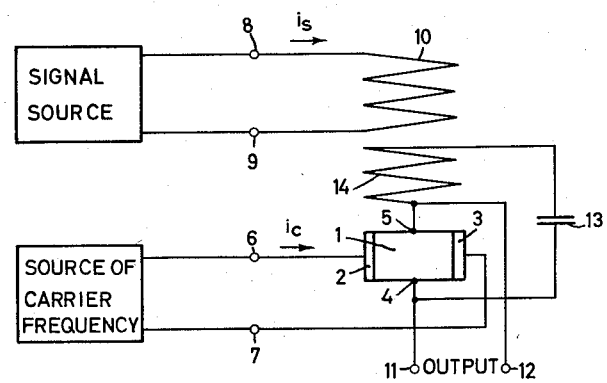
Fig. 2 is a schematic circuit diagram of a complete modulating device according to the invention including a generator as shown in Fig. 1.

The embodiment illustrated in Fig. 2 is a zero-point stabilized Hall modulator which nullifies its remanence automatically in regular intervals of time. As explained above, a slowly variable voltage, such as a direct-current voltage, is applied to the terminals 8, 9 of the excitation winding 10 from a signal source, the excitation current being denoted by an arrow $i_s$. A carrier frequency is impressed upon the terminals 6 and 7 of the current supply electrodes 2, 3 of the Hall plate 1, thus passing through the Hall plate an alternating current represented by an arrow $i_c$. The output terminals 11, 12, connected to the respective Hall electrodes 4 and 5, provide an output voltage which is proportional to the product of the currents $i_s$ and $i_c$ and has the frequency of the carrier current $i_c$. Connected across the Hall electrodes 4 and 5 is an oscillator which comprises a capacitor 13 and the above-mentioned winding 14 and is tuned to a higher frequency than the carrier frequency. For example, when the carrier frequency, derived from a utility line is 50 or 60 cyles per second, the oscillatory circuit 13, 14 may be tuned to several kilocycles per second, for example 10,000 C. P. S.

Figure 3:
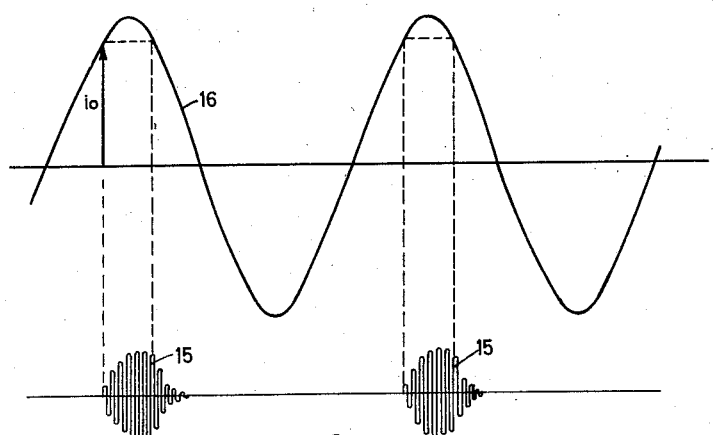
Fig. 3 is an explanatory coordinate diagram illustrating the waves of the carrier currents and remanence-nullifying currents in devices according to the invention.

As is apparent from the current-time diagram of Fig. 3, the oscillatory circuit becomes self-excited and produces a train 15 of high-frequency waves whenever the carrier current $i_c$ reaches a given magnitude $i_0$ and exceeds this magnitude for a short interval of time during the peaks of the sinusoidal voltage or current wave. Only during these short peak intervals are the self-excitation conditions satisfied. The high-frequency oscillations 15 follow each other, for example, in intervals of 20 milliseconds, each occurring during the time in which the upper voltage or current peaks of the carrier-frequency wave 16 occur and which thereafter decay slowly at zero. These individual trains of waves, exciting the coil 14, form the pulses for eliminating the remanence of the magnetic core system. This performance is the more effective the higher the frequency of the alternating nulling voltage. For that reason, it is desirable to choose a highest feasible ratio of nulling frequency to carrier frequency in order to keep the number of individual oscillations within each nulling pulse train as great as possible. A high nulling frequency is also preferable because it facilitates filtering that frequency from the output of the translating device. When using a carrier frequency of 50 to 60 cycles per second together with a nulling frequency in the order of kilocycles per second, for example 10,000 C. P. S., then very simple filter means are sufficient for keeping the nulling oscillations away from the input and output of the modulating device. However, the efficiency of the oscillator declines with an increasing nulling frequency which puts a limitation upon the most desirable frequency value, those above exemplified being in the order of magnitude particularly suitable for the invention.

The commencement of termination of the nullifying wave trains produced in an oscillator of a translating device, as shown in Fig. 2, is limited to either the positive or the negative half wave of the carrier frequency.

Depending upon the (+, −) sign of the carrier current and the poling of the feedback winding 14, the coupling is either positive (cumulative coupling) or negative (counter-coupling), the requirements for excitation of natural oscillations in the oscillatory circuit being satisfied only with a positive coupling. Consequently, the oscillating circuit 13, 14 as shown in Fig. 2 becomes self-excited only when the carrier current has such a sign that the winding 14 acts in the sense of a positive coupling and the carrier current, as explained, exceeds a given magnitude $i_0$ for a short interval of time. The building up of the nulling oscillations in the oscillator takes place with a time characteristic dependent upon the rate of change of the Hall voltage. The higher the carrier current, the smaller is this time constant. Hence the time constant can be increased by providing for amplification in the oscillatory feedback circuit as is exemplified by the embodiment illustrated in Fig. 4.

Figure 4:
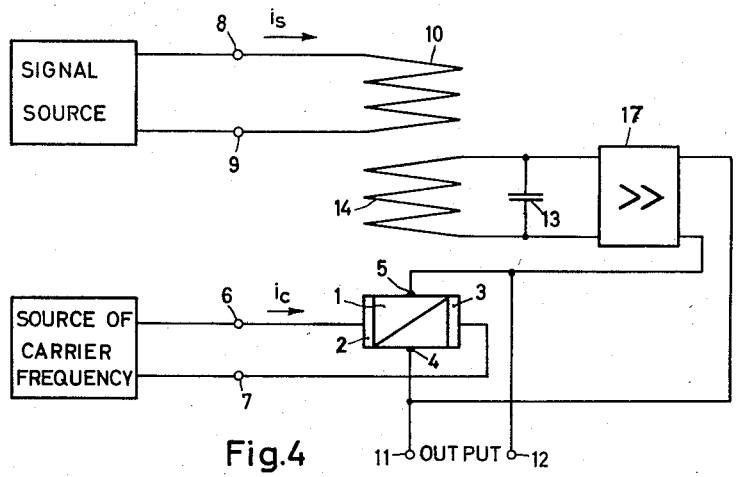
Figs. 4, 5 and 6 show respective circuit diagrams of three other modifications of devices according to the invention.

The translating device according to Fig. 4 corresponds essentially to that described above with reference to Fig. 2, except that the remanence-nulling winding 14 of the magnet core is connected parallel to the capacitor 13 to form a tuned tank circuit together therewith. This tank circuit is excited from the Hall voltage across Hall electrodes 4, 5 through an amplifier 17. By virtue of the amplification, a very rapid initiation and build-up of the nullifying oscillations is obtained.

Figure 5:
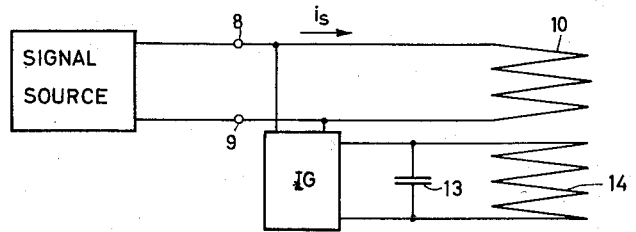

As mentioned above, the nulling currents may also be applied intermittently in the rhythm of the signal or input voltage, for example so that the signals are utilized for triggering a nulling pulse shortly upon termination of an individual signal. An embodiment of this type is illustrated in Fig. 5 which otherwise corresponds to the device described above with reference to Fig. 4. The tank circuit of coil 14 and capacitor 13 is connected to an impulse generator IG which is controlled by the signal voltage from across the input terminals 8, 9 of the Hall generator device. Either the increase or the decrease of the signal voltage, for example the zero passage of the signal voltage in one or the other sense, may be used for triggering the pulse, thus providing for periodic and intermittent nulling of remanence in the magnetic system.

Figure 6:
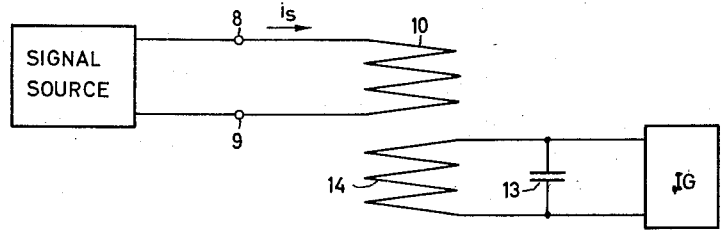

As apparent from Fig. 6, the intermittent operation of the nulling currents may also be controlled, independently of the signal voltage or carrier frequency, by means of an extraneous current source of normally constant frequency. This source is represented by an impulse generator IG so that the tank circuit 13, 14 becomes excited in intervals dependent upon the frequency of the impulse generator. The individual wave trains produced by the oscillator 13, 14 are then released in dependence upon the occurrence of a predetermined current value of the voltage pulse of generator IG.

It will be understood by those skilled in the art, upon a study of this disclosure, that devices according to my invention may be modified in various respects and hence may be given embodiments other than those particularly illustrated and described herein, without departing from the essential features of my invention and within the scope of the claims annexed hereto.

I claim:

1. An electric current-translating device, comprising a Hall-voltage generator having a semiconducting Hall plate with current supply terminals and Hall electrodes and having a magnetizable core with a gap field in which said plate is disposed and a field excitation winding on said core, an input circuit having a source of signal current and being connected to said winding, an energizing circuit having a carrier-frequency source and being connected to said terminals to pass current through said plate, said latter source having a higher frequency than the variation of said signal current, an output circuit connected to said Hall electrodes to provide translated voltage, and oscillation circuit means inductively linked with said core and having a high frequency as compared with said carrier frequency for nulling of magnetic remanence effects of said core.

2. An electric current-translating device, comprising a Hall-voltage generator having a semiconducting Hall plate with current supply terminals and Hall electrodes and having a magnetizable core with a gap field in which said plate is disposed and a field excitation winding on said core, an input circuit having a source of signal current and being connected to said winding, an energizing circuit having a source of carrier frequency and being connected to said terminals to pass current through said plate, said latter source having a higher frequency than the variation of said signal current, an output circuit connected to said electrodes to provide translated voltage, another winding on said core, and an oscillator circuit including said other winding and having a frequency of a higher order of magnitude than said carrier frequency for nulling of remanence effects.

3. In a translating device according to claim 1, said oscillator circuit means comprising another winding on said core and a capacitor connected parallel to said other winding and forming together therewith a tank circuit of said high frequency, said tank circuit being connected to one of said three circuits respectively to be excited from said circuit.

4. An electric current-translating device, comprising a Hall-voltage generator having a semiconducting Hall plate with current supply terminals and Hall electrodes and having a magnetizable core with a gap field in which said plate is disposed and a field excitation winding on said core, an input circuit having a source of signal current and being connected to said winding, an energizing circuit having a source of carrier frequency and being connected to said terminals to pass current through said plate, said latter source having a higher frequency than the variation of said signal current, an output circuit connected to said electrodes to provide translated voltage, and an intermittent oscillator having a frequency of a higher order of magnitude than said carrier frequency, said oscillator being inductively linked with said core to intermittently supply high-frequency wave trains for nulling of remanence effects.

5. In a translating device according to claim 4, said oscillator being connected with said energizing circuit so as to be periodically triggered in dependence upon said carrier-frequency current.

6. In a translating device according to claim 4, said oscillator comprising an impulse generator having a frequency independent of those of said two sources.

7. In a translating device according to claim 4, said oscillator being connected to said input circuit so as to be triggered in the rhythm of the signal-current variations.

8. In a translating device according to claim 2, said oscillator circuit being connected with said output circuit to be feedback-excited by voltage generated in said Hall generator.

9. An electric current-translating device, comprising a Hall-voltage generator having a semiconducting Hall plate with current supply terminals and Hall electrodes and having a magnetizable core with a gap field in which said plate is disposed and a field excitation winding on said core, an input circuit having a source of signal current and being connected to said winding, an energizing circuit having a source of carrier frequency and being connected to said terminals to pass current through said plate, said latter source having a higher frequency than the variation of said signal current, an output circuit connected to said electrodes to provide translated voltage, another winding on said core, an oscillator circuit including said other winding and having a frequency of a higher order of magnitude than said carrier frequency for nulling of remanence effects, and impulse generator means connecting said oscillator circuit with said input circuit for exciting said oscillator circuit to produce high-frequency wave trains in dependence upon the signal voltage of said input circuit.

10. In a translating means according to claim 1, said oscillator circuit means comprising another winding on said core and a capacitor connected in parallel with said other winding to form together therewith a tank circuit of said high frequency, and a feedback connection between said tank circuit and one of said respective energizing and output circuits for exciting said tank circuit to intermittently produce time-limited trains of oscillations in dependence upon peak amplitude values of the carrier frequency.

11. In a translating device according to claim 4, said oscillator being connected to said input circuit and responsive to a given voltage polarity of said signal current so as to produce respective temporary trains of oscillations in response to change in polarity of signal voltage.

12. A translating device according to claim 4, comprising a feedback circuit connecting said oscillator with said output circuit and having an amplifier interposed between said output circuit and said oscillator for periodically exciting said oscillator.

References Cited in the file of this patent
UNITED STATES PATENTS 2,814,015     Kuhrt _____ Nov. 19, 1957